United States Patent
Debrus et al.

(10) Patent No.: US 11,548,268 B2
(45) Date of Patent: Jan. 10, 2023

(54) SUPPRESSION OF ELECTROSTATIC DISCHARGE NOISE BY MEANS OF CONDUCTION BETWEEN A TIERED METAL ELEMENT AND THE WIRING SYSTEM OF A GLAZING UNIT

(71) Applicants: SAINT-GOBAIN GLASS FRANCE, Courbevoie (FR); AIRBUS OPERATIONS SAS, Toulouse (FR)

(72) Inventors: Marie-Hélène Debrus, Dampierre en Burly (FR); Thomas Tondu, Sully (FR); Hugo Canales, Toulouse (FR); Franck Flourens, Toulouse (FR); Catherine Unfer, Toulouse (FR); Osmin Delverdier, Toulouse (FR)

(73) Assignees: SAINT-GOBAIN GLASS FRANCE, Courbevoie (FR); AIRBUS OPERATIONS SAS, Toulouse (FR)

( * ) Notice: Subject to any disclaimer, the term of this patent is extended or adjusted under 35 U.S.C. 154(b) by 561 days.

(21) Appl. No.: 16/628,867

(22) PCT Filed: Jul. 6, 2018

(86) PCT No.: PCT/FR2018/051696
§ 371 (c)(1),
(2) Date: Jan. 6, 2020

(87) PCT Pub. No.: WO2019/008289
PCT Pub. Date: Jan. 10, 2019

(65) Prior Publication Data
US 2020/0223189 A1    Jul. 16, 2020

(30) Foreign Application Priority Data
Jul. 6, 2017    (FR) ...................... 1700719

(51) Int. Cl.
*B32B 17/10*    (2006.01)
*B64C 1/14*    (2006.01)
(Continued)

(52) U.S. Cl.
CPC .... *B32B 17/10036* (2013.01); *B32B 17/1077* (2013.01); *B32B 17/10293* (2013.01);
(Continued)

(58) Field of Classification Search
CPC ........ B32B 17/10036; B32B 17/10293; B32B 17/10376; B32B 17/10385; B64C 1/1476;
(Continued)

(56) References Cited

U.S. PATENT DOCUMENTS

| 3,953,630 A | 4/1976 | Roberts et al. |
| 3,974,359 A | 8/1976 | Orcutt et al. |
| 2013/0026296 A1 | 1/2013 | Yokoi et al. |

FOREIGN PATENT DOCUMENTS

| EP | 0 376 190 A2 | 7/1990 |
| FR | 2 888 082 A1 | 1/2007 |
| JP | 2000-286591 A1 | 10/2000 |

OTHER PUBLICATIONS

International Search Report as issued in International Patent Application No. PCT/FR2018/051696, dated Dec. 11, 2018.

*Primary Examiner* — Zachary M Davis
(74) *Attorney, Agent, or Firm* — Pillsbury Winthrop Shaw Pittman LLP

(57) ABSTRACT

A laminated glazing includes a first and a second glass sheet that are bonded by a first interlayer adhesive layer, a peripheral zone of the laminated glazing being covered by a stepped metal element, the laminated glazing including a heating network of wires and/or a heating electrically conductive layer that is provided with busbars, a plurality of probes and other optional electrical elements that are linked (Continued)

to an electrical power supply via the connector of the laminated glazing, an electrical conductor linking the stepped metal element to a busbar of the heating network of wires and/or of the heating electrically conductive layer; and/or to the cap of the connector of the laminated glazing, which is linked to the ground of the structure for mounting the laminated glazing; and/or to a contact of the connector.

19 Claims, 1 Drawing Sheet

(51) Int. Cl.
*B64D 45/02* (2006.01)
*H05B 3/86* (2006.01)

(52) U.S. Cl.
CPC .. *B32B 17/10376* (2013.01); *B32B 17/10385* (2013.01); *B32B 17/10743* (2013.01); *B32B 17/10761* (2013.01); *B32B 17/10788* (2013.01); *B64C 1/1492* (2013.01); *B64D 45/02* (2013.01); *H05B 3/86* (2013.01); *B32B 2605/18* (2013.01); *B64D 2221/00* (2013.01)

(58) Field of Classification Search
CPC ..... B64C 1/1484; B64C 1/1492; B64D 45/02; H05B 3/48; H05B 3/845; H05B 3/86
See application file for complete search history.

SUPPRESSION OF ELECTROSTATIC DISCHARGE NOISE BY MEANS OF CONDUCTION BETWEEN A TIERED METAL ELEMENT AND THE WIRING SYSTEM OF A GLAZING UNIT

CROSS-REFERENCE TO RELATED APPLICATIONS

This application is the U.S. National Stage of PCT/FR2018/051696, filed Jul. 6, 2018, which in turn claims priority to French patent application number 1700719 filed Jul. 6, 2017. The content of these applications are incorporated herein by reference in their entireties.

Aircraft cockpit glazings are assemblies of mineral and/or organic glasses assembled together by lamination with interlayer adhesive layers. The penetration of water by diffusion through the interlayer adhesive layers may lead to faults in the laminated glazing, for example by promoting delamination or by damaging the electrical systems that are incorporated within the glazing.

A common counter to the penetration of moisture into the lamination interlayer adhesive layers consists in peripherally applying a conformal metal element to a peripheral zone of the laminated glazing, in particular a stepped metal element as will be seen hereinafter, which metal element is commonly referred to as a "zed" due to the shape of this strip.

This zed is bonded to the glass sheets of the laminated glazing and may be covered by an air- and watertight seal, for example made of silicone or equivalent, as well as by a "bead" (external seal) affording good durability and aerodynamic properties. This external seal is made of polysulfide or equivalent.

The metal zed is therefore located within silicone and polysulfide, and is electrically isolated from the internal electrical elements of the laminated glazing and from its mounting structure. It is electrically floating, and liable to carry electrostatic charge. It may be charged under certain flight conditions at potentials that differ substantially from those of the aircraft structure. The zed typically becomes charged due to flights through a charging environment: triboelectric charging through impacts with particles in the environment such as snow, ice, dust or pollution. Although the aircraft structure is fitted with discharging systems, elements such as the glazings, which are electrically isolated, accumulate charge.

In particular, the charge gathered by the glazing may be partly drained into the zed. Potentials allowing electrostatic discharges between the zed and the aircraft structure (or electrical systems incorporated within the glazing) may be reached.

This may result in
a sound signature startling the pilot;
a light signature (flash, sparks) startling the pilot;
an electromagnetic signature interfering with aircraft equipment.

The object of the invention is to prevent the occurrence of discharge potentials by managing the flow of electricity toward electrical elements inside the glazing.

This object is achieved by the invention, which consequently has as subject matter a laminated glazing comprising at least a first glass sheet forming an exterior face of the glazing, which first sheet is linked to a second glass sheet by a first interlayer adhesive layer, wherein the edge of the first glass sheet is set back with respect to that of the second, a peripheral portion of the free surface of the first glass sheet, the edge of this glass sheet, the edge of the first interlayer adhesive layer and a portion of the surface of the second glass sheet extending beyond the first glass sheet describing a continuous stepped contour which is covered by a stepped metal element, the laminated glazing comprising a heating network of wires and/or a heating electrically conductive layer that is provided with busbars, a plurality of probes for measuring temperature and other optional electrical elements that are linked to an electrical power supply via the connector of the laminated glazing, characterized in that an electrical conductor links the stepped metal element to a busbar of the heating network of wires and/or of the heating electrically conductive layer; and/or to the cap of the connector of the laminated glazing, which is linked to the ground of the structure for mounting the laminated glazing; and/or to a contact of the connector linking the heating network of wires and/or the heating electrically conductive layer, a probe or any other optional electrical element to the ground of the structure for mounting the laminated glazing; and/or to a contact of the connector linking only the electrical conductor to the ground of the structure for mounting the laminated glazing; and/or to a contact of the connector with a probe or any other optional electrical element, but not with the ground of the structure for mounting the laminated glazing.

As mentioned above, the stepped metal element prevents moisture from penetrating into the lamination interlayer adhesive layers. It may be made of aluminum, stainless steel or other metal, and may interchangeably be referred to as the "zed" hereinafter.

The connector of the laminated glazing is for example a male connector that is intended to be linked to the female connector of the structure for mounting the glazing, in particular the structure of an aircraft.

The electrical conductor is a wire, in particular a multistranded wire made of copper, aluminum or other.

The heating network of wires and/or the heating electrically conductive layer provided with busbars, the probes and other optional electrical elements may or may not be linked to ground.

Preferably, an electrically insulating resistor of at most 30 M$\Omega$ is connected in series with the electrical conductor.

This measure aims to
provide protection for persons, since the zed does not have to be at the network potential;
prevent local overheating in the case of a localized current leakage from the electrical network to a ground;
prevent the propagation of lightning through an electrical circuit inside the aircraft in the event the zed is struck by lightning;
prevent electrical interference with control systems in particular through the injection of current into this system.

The electrically insulating resistor may be incorporated within the laminated glazing, optionally within the connector of the laminated glazing, or on the edge of the laminated glazing, in the tightness seal which will be described below. When it links to an element that is electrically linked to a ground, it may be zero: otherwise, it is at least equal to 1 M$\Omega$ for reasons of electrical risk or electrical leakage prevention.

According to other preferred features of the laminated glazing of the invention:
it comprises at least a third glass sheet that is linked to the second glass sheet by a second interlayer adhesive layer;

the heating network of wires and/or the heating electrically conductive layer provided with busbars is at the interface between the first glass sheet and the first interlayer adhesive layer; this positioning is the closest possible to the exterior surface of the glazing while allowing the heating wires/heating layer to be protected within the laminated structure, and therefore makes it possible to limit as far as possible the heating power required to remove frost formed on the exterior surface of the glazing; in this case, the probes are in the first interlayer adhesive layer; this arrangement is applied to the aircraft cockpit front glazings (windshield);

according to one alternative, the heating network of wires and/or the heating electrically conductive layer provided with busbars is at the interface between the second glass sheet and the first interlayer adhesive layer or between the second glass sheet and the second interlayer adhesive layer, in which case the probes are in the second interlayer adhesive layer; this arrangement aims to remove the condensation that is liable to form on the interior surface of the glazing; it is applied to the aircraft cockpit side glazings, the exterior surface of which does not in general collect drops of water that are liable to crystallize as frost;

said continuous stepped contour is covered by the stepped metal element (or zed) with the interposition of an external seal, a portion of which is folded over the stepped metal element so as to afford the laminated glazing good durability and aerodynamic properties; the external seal is made of polysulfide or equivalent;

the stepped metal element is covered by an air- and watertight seal made of silicone or equivalent;

the first glass sheet is made of a mineral glass with a thickness of between 0.5 and 5 mm, preferably between 2 and 4 mm, or made of a polymer material such as poly(methyl methacrylate) (PMMA) with a thickness of between 0.5 and 5 mm;

the second glass sheet and, if applicable, the third glass sheet and so on are made of a mineral glass with a thickness of between 5 and 10 mm, or made of a polymer material such as poly(methyl methacrylate) (PMMA) with a thickness of between 5 and 30 mm, preferably at most 20 mm; these glass sheets are referred to as "structural folds";

the interlayer adhesive layers are made of polyurethane (PU), polyvinyl butyral (PVB), ethylene/vinyl acetate (EVA) or equivalent, the thickness of the first interlayer adhesive layer is between 3 and 10 mm, preferably 4 and 8 mm, and the thickness of the second interlayer adhesive layer and, if applicable, of the following layers is between 0.5 and 4 mm, preferably at most equal to 2 mm.

Another subject matter of the invention consists in a process for manufacturing a laminated glazing such as described above, characterized in that the electrical connection of the electrical conductor to the stepped metal element is brazed, glued or pinched; and/or the electrical connection of the electrical conductor to the busbar is glued, brazed, crimped or pinched; and/or the electrical connection of the electrical conductor to the contacts of the connector is brazed or crimped; and/or the electrical connection of the electrical conductor to the cap of the connector is brazed or screwed.

Another subject matter of the invention consists in the use of a laminated glazing described above as building, ground, air or water vehicle glazing, or glazing for street furniture, in particular as aircraft cockpit glazing. Aircraft cockpits may include two front glazings and two to four side glazings.

The invention will be better understood in light of the following description of the appended drawings, in which.

In this example, a glass sheet refers to a chemically tempered aluminosilicate glass sheet, marketed by Saint-Gobain Sully under the Solidion® registered trademark.

Figure 1:
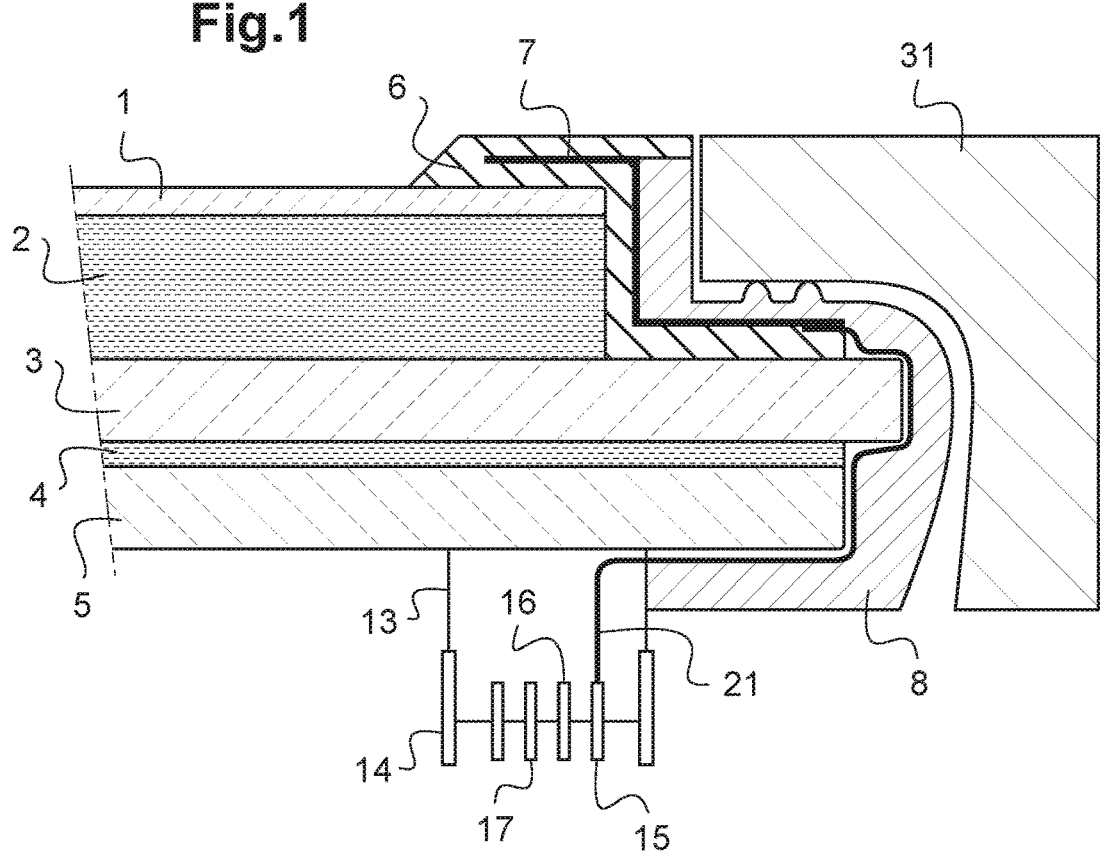
FIG. 1 is a schematic representation of a laminated glazing according to the invention in which the zed is electrically linked to a contact of the connector of the laminated glazing.
Figure 2:
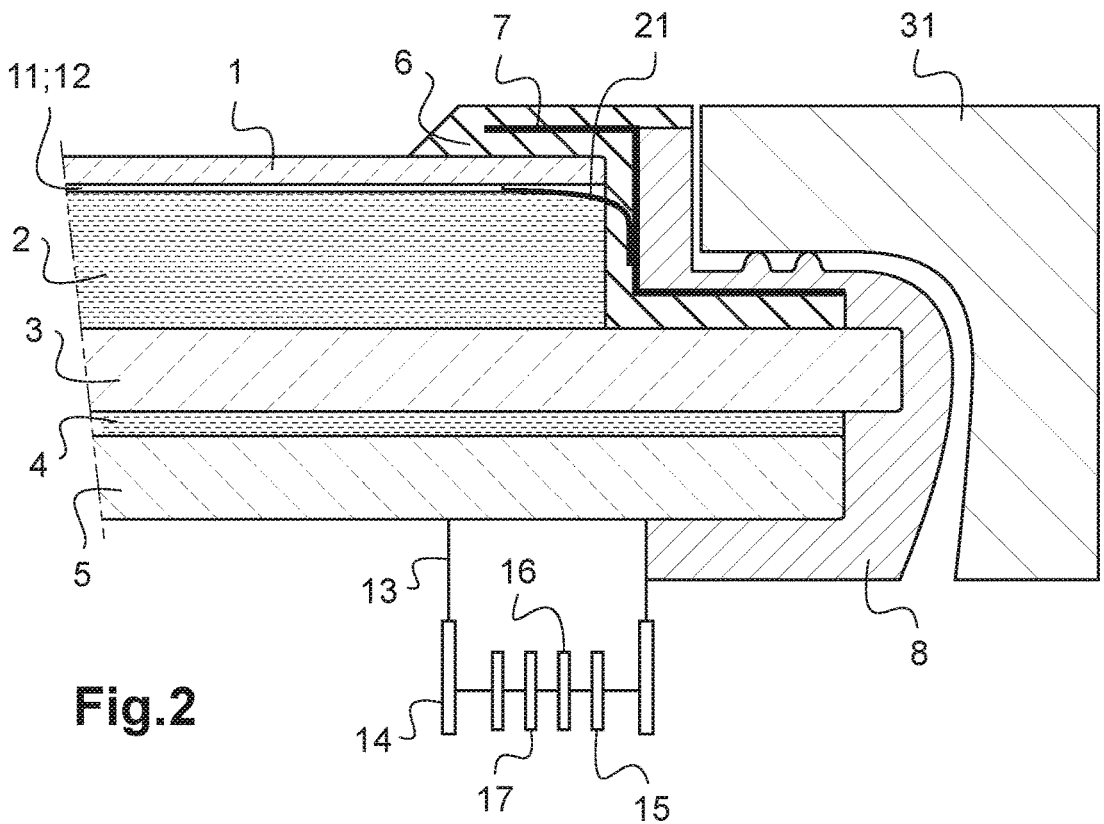
FIG. 2 is a schematic representation of a laminated glazing according to the invention in which the zed is electrically linked to a busbar of the heating network of wires and/or of the heating electrically conductive layer.

With reference to FIGS. 1 and 2, a laminated glazing comprises a first glass sheet 1 forming an exterior face of the glazing, having a thickness of 3 mm, which is bonded to a second glass sheet 3 having a thickness of 8 mm by a first polyvinyl butyral (PVB) interlayer adhesive layer 2 having a thickness of 5.3 mm.

A third glass sheet 5 having a thickness of 8 mm is bonded to the second 3 by a second polyvinyl butyral (PVB) interlayer adhesive layer 4 having a thickness of 2 mm.

The edge of the first glass sheet 1 is set back with respect to that of the second 3, a peripheral portion of the free surface of the first glass sheet 1, the edge of this glass sheet 1, the edge of the first interlayer adhesive layer 2 and a portion of the surface of the second glass sheet 3 extending beyond the first glass sheet 1 describing a continuous stepped contour which is covered by a stepped metal element 7 made of aluminum.

Said continuous stepped contour is covered by the stepped metal element 7 with the interposition of an external seal 6 made of polysulfide, a portion of which is folded over the stepped metal element 7 so as to afford the laminated glazing good durability and aerodynamic properties.

The stepped metal element 7 is covered by an air- and watertight seal 8 made of silicone.

With reference to FIG. 2, a heating network of wires and/or a heating electrically conductive layer 11 provided with busbars 12 is at the interface between the first glass sheet 1 and the first interlayer adhesive layer 2.

Probes for measuring temperature (not shown) are in the first interlayer adhesive layer 2.

The heating network of wires and/or the heating electrically conductive layer 11 that is provided with busbars 12, the probes for measuring temperature and other optional electrical elements are linked to an electrical power supply via the connector 13 of the laminated glazing.

An electrical conductor 21 made of American wire gauge 24 (AWG 24) multistranded copper links the stepped metal element 7 to a busbar 12 of the heating network of wires and/or of the heating electrically conductive layer 11 (FIG. 2); and/or to the cap 14 of the connector 13 of the laminated glazing, which is linked to the ground of the structure for mounting the laminated glazing; and/or to a contact 15 of the connector 13 linking the heating network of wires and/or the heating electrically conductive layer 11, a probe or any other optional electrical element to the ground of the structure for mounting the laminated glazing (FIG. 1); and/or to a contact 16 of the connector 13 linking only the electrical conductor 21 to the ground of the structure for mounting the laminated glazing; and/or to a contact 17 of the connector 13 with a probe or any other optional electrical element, but not with the ground of the structure for mounting the laminated glazing.

The laminated glazing shown in FIGS. 1 and 2 may be installed from the outside via a structure for mounting the laminated glazing, by bolting a window press 31 covering the laminated glazing to the mounting structure; this bolting may or may not result in the laminated glazing being pinched, the laminated glazing may also be bonded to the window press 31, and in any case held durably secure to the mounting structure. The window press 31 is a trim added from the outside.

Mounting from the inside is also possible. In this case, the shape of the window press mentioned above is present but forms an integral part of the mounting structure, and a trim (window press) is added from the inside. Bolting the window press and bonding the laminated glazing may be combined, with or without the laminated glazing being pinched.

No unwanted discharging of the zed, nor any disruptive noise signaling this discharge, are observed in the glazings according to the invention.

The invention claimed is:

1. A laminated glazing comprising at least a first glass sheet forming an exterior face of the glazing, which first glass sheet is linked to a second glass sheet by a first interlayer adhesive layer, wherein an edge of the first glass sheet is set back with respect to an edge of the second glass sheet, a peripheral portion of a free surface of the first glass sheet, the edge of the first glass sheet, an edge of the first interlayer adhesive layer and a portion of a surface of the second glass sheet extending beyond the first glass sheet describing a continuous stepped contour which is covered by a stepped metal element, the laminated glazing comprising a heating network of wires and/or a heating electrically conductive layer that is provided with busbars, a plurality of probes for measuring temperature and other optional electrical elements that are linked to an electrical power supply via a connector of the laminated glazing, wherein said continuous stepped contour is covered by the stepped metal element with the interposition of an external seal, wherein the stepped metal element is covered by an air- and water-tight seal, wherein an electrical conductor links the stepped metal element to a busbar of the heating network of wires and/or of the heating electrically conductive layer; and/or to a cap of the connector of the laminated glazing, which is linked to the ground of a structure for mounting the laminated glazing; and/or to a contact of the connector linking the heating network of wires and/or the heating electrically conductive layer, a probe or any other optional electrical element to the ground of a structure for mounting the laminated glazing; and/or to a contact of the connector linking only the electrical conductor to the ground of the structure for mounting the laminated glazing; and/or to a contact of the connector with a probe or any other optional electrical element, but not with the ground of a structure for mounting the laminated glazing; and wherein an electrically insulating resistor of at most 30 MΩ is connected in series with the electrical conductor.

2. The laminated glazing as claimed in claim 1, further comprising at least a third glass sheet that is linked to the second glass sheet by a second interlayer adhesive layer.

3. The laminated glazing as claimed in claim 1, wherein the heating network of wires and/or the heating electrically conductive layer provided with busbars is at the interface between the first glass sheet and the first interlayer adhesive layer.

4. The laminated glazing as claimed in claim 3, wherein the probes are in the first interlayer adhesive layer.

5. The laminated glazing as claimed in claim 1, wherein the heating network of wires and/or the heating electrically conductive layer provided with busbars is at the interface between the second glass sheet and the first interlayer adhesive layer or between the second glass sheet and the second interlayer adhesive layer.

6. The laminated glazing as claimed in claim 5, wherein the probes are in the second interlayer adhesive layer.

7. The laminated glazing as claimed in claim 1, wherein a portion of the external seal is folded over the stepped metal element so as to afford the laminated glazing good durability and aerodynamic properties.

8. The laminated glazing as claimed in claim 1, wherein the first glass sheet is made of a mineral glass with a thickness of between 0.5 and 5 mm, or made of a polymer material with a thickness of between 0.5 and 5 mm.

9. The laminated glazing as claimed in claim 8, wherein the thickness of the first glass sheet is between 2 and 4 mm.

10. The laminated glazing as claimed in claim 8, wherein the polymer material is poly(methyl methacrylate) (PMMA).

11. The laminated glazing as claimed in claim 1, wherein the second glass sheet and, if applicable, the third glass sheet and so on are made of a mineral glass with a thickness of between 5 and 10 mm, or made of a polymer material with a thickness of between 5 and 30 mm, preferably at most 20 mm.

12. The laminated glazing as claimed in claim 11, wherein the polymer material is poly(methyl methacrylate) (PMMA).

13. The laminated glazing as claimed in claim 11, wherein the thickness of the polymer is at most 20 mm.

14. The laminated glazing as claimed in claim 1, wherein the interlayer adhesive layers are made of polyurethane, polyvinyl butyral, ethylene/vinyl acetate or equivalent, wherein a thickness of the first interlayer adhesive layer is between 3 and 10 mm, and wherein a thickness of the second interlayer adhesive layer and, if applicable, of the following layers is between 0.5 and 4 mm.

15. The laminated glazing as claimed in claim 14, wherein the thickness of the first interlayer adhesive layer is between 4 and 8 mm.

16. The laminated glazing as claimed in claim 14, wherein the thickness of the second interlayer adhesive layer and, if applicable, of the following layers is at most equal to 2 mm.

17. A process for manufacturing a laminated glazing as claimed in claim 1, wherein the electrical connection of the electrical conductor to the stepped metal element is brazed, glued or pinched; and/or the electrical connection of the electrical conductor to the busbar is glued, brazed, crimped or pinched; and/or the electrical connection of the electrical conductor to the contacts of the connector is brazed or crimped; and/or the electrical connection of the electrical conductor to the cap of the connector is brazed or screwed.

18. A method comprising utilizing a laminated glazing as claimed in claim 1 as building, ground, air or water vehicle glazing, or glazing for street furniture.

19. The method as claimed in claim 18, wherein the laminated glazing is an aircraft cockpit glazing.

* * * * *